US012598686B2

(12) United States Patent
Igo et al.

(10) Patent No.: US 12,598,686 B2
(45) Date of Patent: *Apr. 7, 2026

(54) CONTROLLABLE MULTIPLE LIGHTING ELEMENT FIXTURE

(71) Applicant: Feit Electric Company, Inc., Pico Rivera, CA (US)

(72) Inventors: Shane Igo, Pico Rivera, CA (US); Alan Feit, Encino, CA (US); Brian Halliwell, Pico Rivera, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,153

(22) Filed: Dec. 16, 2022

(65) Prior Publication Data

US 2023/0142389 A1 May 11, 2023

Related U.S. Application Data

(63) Continuation of application No. 17/100,111, filed on Nov. 20, 2020, now Pat. No. 11,564,302.

(51) Int. Cl.
*H05B 47/155* (2020.01)
*H05B 47/165* (2020.01)
*H05B 47/175* (2020.01)

(52) U.S. Cl.
CPC ......... *H05B 47/155* (2020.01); *H05B 47/165* (2020.01); *H05B 47/175* (2020.01)

(58) Field of Classification Search
CPC ... H05B 47/155; H05B 47/165; H05B 47/175
See application file for complete search history.

(56) References Cited

U.S. PATENT DOCUMENTS 6,127,783 A 10/2000 Pashley et al.
6,149,283 A 11/2000 Conway et al.
6,201,351 B1 3/2001 Rudolph et al.
6,357,889 B1 3/2002 Duggal et al.
(Continued)

FOREIGN PATENT DOCUMENTS

CN 201844227 U 5/2011
CN 204069421 U 12/2014
(Continued)

OTHER PUBLICATIONS

Ishida et al., English translation of "CN-112889351-A" 22 pages (Year: 2021).*
(Continued)

*Primary Examiner* — Daniel D Chang
(74) *Attorney, Agent, or Firm* — Alston & Bird LLP

(57) ABSTRACT

A controllable multiple lighting element fixture and a method of controlling the same are provided. An example lighting fixture includes one or more first lighting elements positioned within or along a lighting housing. The example lighting fixture further includes one or more second lighting elements positioned within or along a circumference or perimeter of the lighting housing. The example lighting fixture further includes control circuitry configured to control one or more parameters associated with the one or more first lighting elements and the one or more second lighting elements.

21 Claims, 4 Drawing Sheets

(56) References Cited

U.S. PATENT DOCUMENTS 6,781,329 B2 8/2004 Mueller et al.
6,834,981 B2 12/2004 Nagai et al.
7,014,336 B1 3/2006 Ducharme et al.
7,083,293 B2 8/2006 Kalinski
7,201,489 B2 4/2007 Shyu
7,255,457 B2 8/2007 Ducharme et al.
7,288,902 B1 10/2007 Melanson
7,405,715 B2 7/2008 Guzman et al.
7,416,312 B1 8/2008 McDermott
7,484,860 B2 2/2009 Demarest et al.
7,520,634 B2 4/2009 Ducharme et al.
7,521,667 B2 4/2009 Rains, Jr. et al.
7,659,674 B2 2/2010 Mueller et al.
7,665,882 B1 2/2010 Wang
7,883,239 B2 2/2011 Rains, Jr. et al.
7,926,300 B2 4/2011 Roberts et al.
7,988,327 B1 8/2011 Knoble et al.
8,044,608 B2 10/2011 Kuo et al.
8,076,867 B2 12/2011 Kuo et al.
8,111,017 B2 2/2012 Lin et al.
8,159,125 B2 4/2012 Miao
8,172,415 B2 5/2012 Wegh et al.
8,207,821 B2 6/2012 Roberge et al.
8,220,970 B1 7/2012 Khazi et al.
8,305,013 B2 11/2012 Lin et al.
8,314,571 B2 11/2012 Jonsson
8,317,362 B2 11/2012 Ku et al.
8,330,388 B2 12/2012 Kuo et al.
8,339,063 B2 12/2012 Yan et al.
8,339,067 B2 12/2012 Lin et al.
8,378,588 B2 2/2013 Kuo et al.
8,378,589 B2 2/2013 Kuo et al.
8,430,402 B2 4/2013 Diehl et al.
8,482,219 B2 7/2013 Kuo et al.
8,508,150 B2 8/2013 Kuo et al.
8,598,793 B2 12/2013 Yan et al.
8,664,895 B2 3/2014 Yan et al.
8,669,722 B2 3/2014 Yeh et al.
8,729,812 B2 5/2014 Kuwu
8,853,950 B1 10/2014 Chang
8,872,438 B2 10/2014 Zhou et al.
8,884,508 B2 11/2014 Pickard et al.
8,890,440 B2 11/2014 Yan et al.
8,941,312 B2 1/2015 McRae
8,947,013 B2 2/2015 Sutardja et al.
9,030,122 B2 5/2015 Yan et al.
9,072,148 B2 6/2015 Tanaka et al.
9,119,252 B2 8/2015 Wu
9,144,129 B2 9/2015 Munday
9,232,591 B2 1/2016 Kuo et al.
9,232,602 B2 1/2016 Yeh et al.
9,253,843 B2 2/2016 Lee et al.
9,386,653 B2 7/2016 Kuo et al.
9,441,801 B1 9/2016 Myers et al.
9,642,208 B2 5/2017 Van De Ven
9,713,211 B2 7/2017 Van De Ven et al.
9,730,291 B1 8/2017 Janik et al.
9,781,793 B2 10/2017 Yan et al.
9,786,639 B2 10/2017 Bergmann et al.
9,788,373 B1 10/2017 Chowdhury
9,799,125 B1 10/2017 Wegner et al.
9,801,250 B1 10/2017 Halliwell
9,820,350 B2 11/2017 Pyshos et al.
9,892,693 B1 2/2018 Kumar et al.
9,900,945 B1 2/2018 Janik et al.
9,909,723 B2 3/2018 Bergmann et al.
9,924,582 B2 3/2018 Vendetti et al.
9,974,138 B2 5/2018 Allen et al.
10,008,484 B2 6/2018 Bergmann et al.
10,009,971 B2 6/2018 Chobot et al.
10,018,346 B2 7/2018 Van De Ven et al.
10,076,011 B1 9/2018 Amidi et al.
10,091,855 B2 10/2018 Van Winkle
10,104,742 B2 10/2018 Halliwell
10,117,300 B2 10/2018 Doheny et al.
10,136,503 B2 11/2018 Chen
10,163,405 B2 12/2018 Kumar et al.
10,231,300 B2 3/2019 Cash et al.
10,278,250 B2 4/2019 McBryde et al.
10,290,265 B2 5/2019 Kumar et al.
10,292,233 B1 5/2019 Udavant et al.
10,299,335 B2 5/2019 Pyshos et al.
10,299,336 B2 5/2019 Bowen et al.
10,334,678 B2 6/2019 Janik et al.
10,433,390 B2 10/2019 Halliwell
10,462,871 B2 10/2019 Van Winkle
10,492,262 B2 11/2019 Van Winkle
10,602,584 B2 3/2020 Pyshos et al.
10,683,969 B2 6/2020 Jeswani et al.
10,718,474 B1 7/2020 Von Fange et al.
10,893,587 B2 1/2021 Halliwell
10,904,969 B2 1/2021 Halliwell
10,935,212 B1 * 3/2021 Stolte ...................... F21S 8/026
11,147,136 B1 10/2021 Igo et al.
11,242,958 B2 2/2022 Halliwell
11,248,752 B2 2/2022 Halliwell
11,248,753 B1 2/2022 Li
11,564,302 B2 1/2023 Igo et al.
11,598,490 B2 3/2023 Halliwell
11,602,026 B2 3/2023 Igo et al.
11,629,824 B2 4/2023 Halliwell
11,683,874 B2 6/2023 Cohen et al.
11,906,114 B2 2/2024 Halliwell
2002/0048169 A1 4/2002 Dowling et al.
2002/0071279 A1 6/2002 Katogi et al.
2002/0195975 A1 12/2002 Schanberger
2004/0080938 A1 4/2004 Holman et al.
2004/0264187 A1 12/2004 Vanderschuit
2005/0012457 A1 1/2005 Wu
2005/0077837 A1 4/2005 Kim et al.
2005/0128751 A1 6/2005 Roberge et al.
2005/0270780 A1 12/2005 Zhang
2005/0285547 A1 12/2005 Piepgras et al.
2006/0220586 A1 10/2006 Latham
2006/0237636 A1 10/2006 Lyons et al.
2006/0238136 A1 10/2006 Johnson, III et al.
2007/0206375 A1 9/2007 Piepgras et al.
2007/0247840 A1 10/2007 Ham
2007/0273290 A1 11/2007 Ashdown et al.
2008/0060917 A1 3/2008 Chen et al.
2008/0106893 A1 5/2008 Johnson et al.
2008/0265799 A1 10/2008 Sibert
2009/0052170 A1 2/2009 Jeng et al.
2010/0237798 A1 9/2010 Wolf et al.
2010/0328946 A1 12/2010 Borkar et al.
2011/0068702 A1 3/2011 Van et al.
2011/0193479 A1 8/2011 Nilssen et al.
2012/0187835 A1 7/2012 Jonsson
2012/0306377 A1 12/2012 Igaki et al.
2012/0327660 A1 12/2012 Lin
2013/0003417 A1 1/2013 Chien et al.
2013/0038222 A1 2/2013 Yeh et al.
2013/0038244 A1 2/2013 Kamii et al.
2013/0114241 A1 5/2013 Van De Ven et al.
2013/0147359 A1 6/2013 Chobot
2013/0154510 A1 6/2013 Sutardja et al.
2013/0201668 A1 8/2013 Chien et al.
2013/0270999 A1 10/2013 Ramer et al.
2013/0328503 A1 12/2013 Toda
2014/0049956 A1 * 2/2014 Manahan ................ F21V 21/14
362/249.02
2014/0049972 A1 2/2014 McGuire et al.
2014/0070700 A1 3/2014 Genthon et al.
2014/0184080 A1 7/2014 Rybicki et al.
2014/0210357 A1 7/2014 Yan et al.
2014/0210376 A1 7/2014 Hicks, IV
2014/0239811 A1 8/2014 Kreiner
2014/0264406 A1 9/2014 Muehlbacher et al.
2014/0268700 A1 9/2014 Mumma et al.
2014/0361696 A1 12/2014 Siessegger et al.
2014/0364219 A1 12/2014 Matsushita et al.
2015/0029712 A1 1/2015 Nakamura et al.
2015/0035454 A1 2/2015 Chang
2015/0048758 A1 2/2015 Carrigan et al.

(56) References Cited

U.S. PATENT DOCUMENTS

2015/0054410 A1 2/2015 Sanders et al.
2015/0061497 A1 3/2015 Martins et al.
2015/0070897 A1 3/2015 Chien
2015/0084513 A1 3/2015 Anthony et al.
2015/0276204 A1 10/2015 Ray
2015/0296577 A1 10/2015 Chen
2016/0286633 A1 9/2016 Juslen
2016/0295658 A1 10/2016 Chraibi et al.
2016/0316527 A1 10/2016 Allen et al.
2016/0345416 A1 11/2016 Brochu et al.
2017/0019973 A1 1/2017 Beck et al.
2017/0068043 A1 3/2017 Myers
2017/0080849 A1 3/2017 Nogha et al.
2017/0086265 A1 3/2017 Akiyama et al.
2017/0105265 A1 4/2017 Sadwick
2017/0167705 A1 6/2017 Jacobson
2017/0181241 A1 6/2017 Koo
2017/0227174 A1 8/2017 May
2017/0303363 A1 10/2017 Pyshos et al.
2017/0354022 A1 12/2017 Dimberg et al.
2018/0092183 A1 3/2018 Halliwell
2018/0187319 A1 7/2018 Yakumaru et al.
2018/0206305 A1 7/2018 Van Winkle
2018/0227991 A1 8/2018 Hegde et al.
2018/0288847 A1 10/2018 Halliwell
2018/0310383 A1 10/2018 Joergensen
2018/0311386 A1 11/2018 Hawkins et al.
2019/0037661 A1 1/2019 Halliwell
2019/0242533 A1 8/2019 Smith
2019/0373701 A1 12/2019 Halliwell
2020/0187319 A1 6/2020 Jiang et al.
2021/0105877 A1 4/2021 Halliwell
2021/0120644 A1 4/2021 Halliwell
2021/0180780 A1 6/2021 Stolte et al.
2021/0243873 A1* 8/2021 Ishida .................. G06F 3/0488
2021/0282249 A1 9/2021 Huang et al.
2022/0120386 A1 4/2022 Halliwell
2022/0128200 A1 4/2022 Halliwell
2022/0167483 A1 5/2022 Igo et al.
2022/0183122 A1 6/2022 Igo et al.
2023/0167952 A1 6/2023 Halliwell
2023/0189413 A1 6/2023 Igo et al.
2023/0235860 A1 7/2023 Halliwell
2024/0023215 A1 1/2024 Lu et al.
2024/0142067 A1 5/2024 Halliwell

FOREIGN PATENT DOCUMENTS

CN 105221949 A 1/2016
CN 112889351 A * 6/2021 ......... G06F 3/04845
DE 202011103835 U1 12/2011
JP 2013254666 A 12/2013

OTHER PUBLICATIONS

Advisory Action for U.S. Appl. No. 16/545,873, dated May 20, 2020, (6 pages), United States Patent and Trademark Office, US.
Final Office Action for U.S. Appl. No. 16/001,260, dated Dec. 20, 2018, (17 pages), United States Patent and Trademark Office, US.
Final Office Action for U.S. Appl. No. 16/001,260, dated Feb. 21, 2020, (17 pages), United States Patent and Trademark Office, US.
Final Office Action for U.S. Appl. No. 16/545,873, dated Jul. 27, 2020, (17 pages), United States Patent and Trademark Office, US.
NonFinal Office Action for U.S. Appl. No. 15/274,575, dated Apr. 24, 2017, (13 pages), United States Patent and Trademark Office, US.
NonFinal Office Action for U.S. Appl. No. 15/705,808, dated Feb. 13, 2018, (7 pages), United States Patent and Trademark Office, US.
Final Office Action for U.S. Appl. No. 16/001,260, dated Jul. 29, 2019, (22 pages), United States Patent and Trademark Office, US.
Nonfinal Office Action for U.S. Appl. No. 16/001,260, dated Aug. 10, 2018, (15 pages), United States Patent and Trademark Office, US.
NonFinal Office Action for U.S. Appl. No. 16/001,260, dated Jul. 13, 2020, (20 pages), United States Patent and Trademark Office, US.
NonFinal Office Action for U.S. Appl. No. 16/001,260, dated Nov. 1, 2019, (17 pages), United States Patent and Trademark Office, US.
NonFinal Office Action for U.S. Appl. No. 16/545,873, filed Oct. 28, 2019, (26 pages), United States Patent and Trademark Office, US.
NonFinal Office Action for U.S. Appl. No. 17/113,274, dated Sep. 14, 2021, (7 pages), United States Patent and Trademark Office, US.
NonFinal Office Action for U.S. Appl. No. 17/126,882, dated Aug. 11, 2021, (9 pages), United States Patent and Trademark Office, US.
Notice of Allowance for U.S. Appl. No. 15/274,575, dated Aug. 28, 2017, (12 pages), United States Patent and Trademark Office, US.
Notice of Allowance for U.S. Appl. No. 15/705,808, dated Jun. 22, 2018, (9 pages), United States Patent and Trademark Office, US.
Notice of Allowance for U.S. Appl. No. 16/001,260, dated Oct. 6, 2020, (15 pages), United States Patent and Trademark Office, US.
Notice of Allowance for U.S. Appl. No. 16/128,162, dated Jul. 3, 2019 (10 pages), United States Patent and Trademark Office, US.
Notice of Allowance for U.S. Appl. No. 16/545,873, dated Oct. 16, 2020, (10 pages), United States Patent and Trademark Office, US.
Notice of Allowance for U.S. Appl. No. 17/113,274, dated Oct. 27, 2021, (9 pages), United States Patent and Trademark Office, US.
Notice of Allowance for U.S. Appl. No. 17/126,882, filed Sep. 27, 2021, (10 pages), United States Patent and Trademark Office, US.
Notice of Allowance received for U.S. Appl. No. 17/116,393, dated Jun. 11, 2021, (7 pages), United States Patent and Trademark Office, US.
Office Action for Canadian Patent Application No. 3,021,693, Jul. 26, 2019 (6 pages), Canadian Intellectual Property Office, Quebec, Canada.
Coolux, "Once Again Another Technology Breakthrough of LED Edgt-Lit Panel: the DIP-DIM Panel, 4 Wattage & 3 Color Switchable 130 LM/W", brochure distributed at Lightfair International 2016 Booth #1111, Apr. 26-28, 2016, 4 pages, San Diego, California.
Gisteq Corp., "Gisteq Flashmate F-160 & F-198," YouTube, https://www.youtube.com/watch?v=59Tf4CwF2oU, Aug. 8, 2013.
Hampton Bay, Use and Care Guide, LED Universal Ceiling Fan Light Kit, retrieved from https://images.homedepot-static.com/catalog/pdfImages/8f/8fbdd564-5722-4e5d-b579-e231a0848dd5.pdf on Jun. 12, 2020.
"Ledy 33w 9.84 Inch 36301m 5730 SMD Led Ceiling Light Fixtures Replacement Panel Retrofit Board Light Bulb Replace Incandescent Fluorescent Bulb Round Tube (White)", Mar. 17, 2016, pp. 1-6, retrieved from the Internet at <https://www.amazon.com/Ledy-Fixtures-Replacement-Incandescent-Fluorescent/dp/B01D3G1F3S?th=1> on Aug. 12, 2022.
MSI Solid State Lighting, "Introducing PowerBand™ Variable Wattage Technology", retrieved from <https://www.1000bulbs.com/pdf/led-ipar3843101d-powerband.pdf> on Jan. 11, 2017, 1 page.
MSI Solid State Lighting, "iPAR™ 38 with Powerband Technology", retrieved from <https://www.1000bulbs.com/pdf/led-ipar3843101d-specs.pdf> on Jan. 11, 2017, 2 pages.
Philips Lighting, "Philips Lighting unveils SceneSwitch—a unique LED light bulb range designed to make multi-purpose homes work harder", Jul. 12, 2016, 6 pages, retrieved from <http://www.newsroom.lighting.philips.com/news/2016/20160712-philips-lighting-unveils-sceneswitch-a-unique-led-light-bulb-range-designed-to-make-multi-purpose-homes-work-harder.html> on Jan. 11, 2017.
Unknown Author, "Rambus introduces LED BR30 and PAR30 with mechanically adjustable CCT—LEDs", *LEDs Magazine*, Jun. 12, 2013, 3 pages, retrieved from <http://www.ledsmagazine.com/articles/iif/2013/06/rambus-introduces-led-br30-and-par30-with-mechanically-adjustable-cct.html> on Jan. 11, 2017.
NonFinal Office Action for U.S. Appl. No. 18/161,480, dated Jul. 6, 2023, (7 pages), United States Patent and Trademark Office, US.
Final Rejection Mailed on Feb. 16, 2024 for U.S. Appl. No. 18/180,357, 13 page(s).
Non-Final Rejection Mailed on May 30, 2024 for U.S. Appl. No. 18/155,516, 9 page(s).
Non-Final Rejection Mailed on Aug. 8, 2024 for U.S. Appl. No. 18/410,209, 15 page(s).

(56) References Cited

OTHER PUBLICATIONS

U.S. Appl. No. 17/100,111, filed Nov. 20, 2020, US-2022/0167483, Patented.
Notice of Allowance and Fees Due (PTOL-85) Mailed on Oct. 31, 2024 for U.S. Appl. No. 18/180,357, 8 page(s).

* cited by examiner

CONTROLLABLE MULTIPLE LIGHTING ELEMENT FIXTURE

CROSS-REFERENCE TO RELATED APPLICATIONS

The present application is a continuation of and claims priority to and full benefit of U.S. patent application Ser. No. 17/100,111, filed Nov. 20, 2020; the entire contents of which as are hereby incorporated herein by reference.

BACKGROUND

In order to enable multiple lighting scenes within a single physical space, complicated dimming systems and/or wiring is conventionally required. That is, in order to dim a given light fixture, the light fixture must be dimmable and must be coupled with a dim controller. Such alterations to existing physical spaces are complex, can be expensive, and are fraught with problems. Moreover, conventional dimmable or controllable light fixtures typically only provide a singular set of lighting elements that are not independently operable from one another.

Through applied effort, ingenuity, and innovation many deficiencies of such systems have been solved by developing solutions that are in accordance with the embodiments of the present disclosure, many examples of which are described in detail herein.

SUMMARY

A controllable multiple lighting element fixture and a method of controlling the same are provided. An example lighting fixture includes one or more first lighting elements positioned within or along a lighting housing. The example lighting fixture further includes one or more second lighting elements positioned within or along a circumference or perimeter of the lighting housing. The example lighting fixture further includes control circuitry configured to control one or more parameters associated with the one or more first lighting elements and the one or more second lighting elements.

In various embodiments, each first lighting element of the first lighting elements is associated with a unique lighting zone of a plurality of lighting zones. The plurality of lighting zones may overlap.

In various embodiments, the one or more second lighting elements are associated with a downward lighting zone extending downward from the lighting housing.

In various embodiments, the control circuitry may be responsive to signals received from a remote computing device or to signals received from wall mounted switch circuitry. The control circuitry may include driver circuitry for controlling the one or more parameters.

In various embodiments, the one or more parameters include one or more of direction, color, temperature, dim level, or voltage.

The control circuitry may be configured to adjust one or more parameters for any of the one or more first lighting elements and the one or more second lighting elements in accordance with a designated theme of a plurality of programmable themes. A theme of the plurality of themes includes one or more of office lighting, desk lighting, kitchen lighting, evening lighting, night light lighting, dining lighting, or other programmable scene.

In various embodiments, one or more of the one or more first lighting elements are operable independently from one or more of the one or more second lighting elements.

An example method of controlling a lighting fixture includes controlling, using control circuitry, one or more parameters associated with one or more first lighting elements positioned within or along a lighting housing. The example method further includes controlling, using control circuitry, one or more parameters associated with one or more second lighting elements positioned within or along a circumference or perimeter of the lighting housing.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, and appended Claims signify the nature and advantages of the innovations, embodiments and/or examples of the claimed inventions. All the Figures signify innovations, embodiments, and/or examples of the claimed inventions for purposes of illustration only and do not limit the scope of the claimed inventions. Such Figures are not necessarily drawn to scale and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by a second or third label that distinguishes among the similar components (e.g., 1A and 1B may refer to components of the same type). If only the first reference label is used in the specification, the description is applicable to any one of the similar components having the same first reference label irrespective of the second reference label. A brief description of the Figures is below.

FIG. 5 illustrates an example system architecture within which embodiments of the present disclosure may operate.

FIG. 6 illustrates example control circuitry for use with various embodiments of the present disclosure.

DETAILED DESCRIPTION OF VARIOUS EMBODIMENTS

Figure 1:
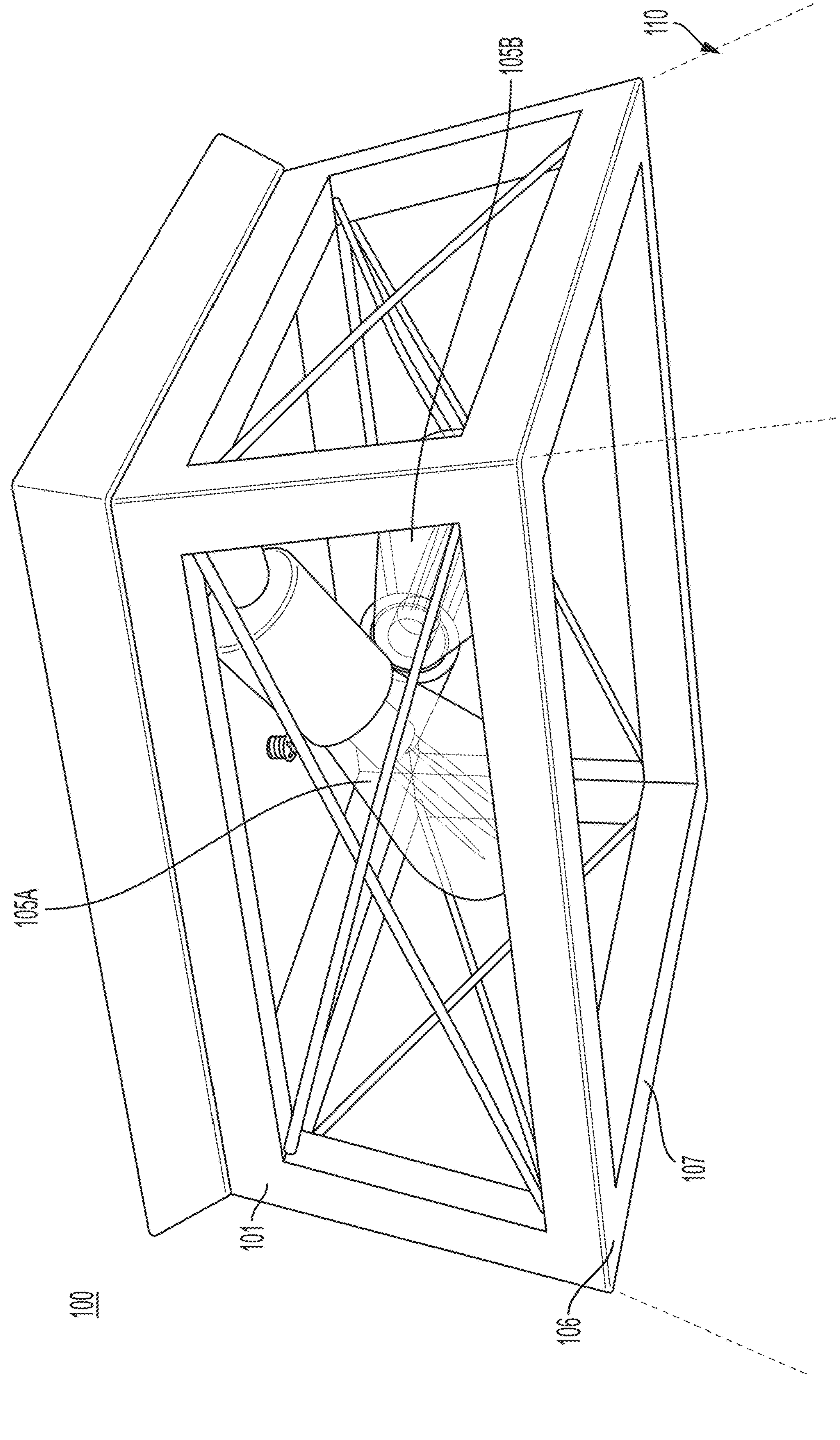
FIG. 1 illustrates an example controllable multiple lighting element fixture according to various embodiments of the present disclosure.

The present disclosure more fully describes various embodiments with reference to the accompanying drawings.

It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Embodiments of the present disclosure enable the use of multiple customizable lighting scenarios in a single physical space without expensive or complicated redesign of existing structures. A controllable multiple lighting element fixture, including multiple independently operable lighting elements, may be controlled by way of wall switch circuitry or by way of a computing or other remote device. A controllable multiple lighting element fixture may further enable a user to program lighting themes for a given physical space, and may respond to signals to implement a lighting theme provided by way of the wall switch circuitry, computing or other remote device.

That is, embodiments of the present disclosure enable a user to select to place the controllable multiple lighting element fixture in a configurable operating mode. In the configurable operating mode, a user may use a remote switch (e.g., a wall switch, remote control, mobile computing device, building control system, and/or the like) to change the one or more operating light aspects or qualities at which the controllable multiple lighting element fixture emits light during the operation of the controllable multiple lighting element fixture. For example, the user may use a remote switch to toggle between preset operating light aspects or qualities.

In certain embodiments, the controllable multiple lighting element fixture may be configured to detect the presence of a specific user (e.g., by way of detection of a particular computing device associated with the user or by way of detection of presence of a user in general) to automatically adjust the lighting elements of the fixture to the user's customized preferences. Such detection may enable a user to transition through a structure, passing or interacting with several physical spaces and therefore several controllable multiple lighting element fixtures, without actively adjusting the lighting (e.g., the lighting is automatically adjusted based upon detection of the user's presence).

In certain embodiments, the multiple lighting elements of the controllable multiple lighting element fixture are independently operable. That is, each lighting element may be operated without impact or consideration of any other lighting elements. Including on or off, operation of each lighting element is customizable according to a variety of parameters, including, for example, color, color temperature, color rendering index (CRI), direction, dim level, voltage, or other controllable parameter. Customizable operating and control of each lighting element may be associated with various configurable light qualities (e.g., also referred to herein as parameters). Examples of such configurability and more are described in co-pending U.S. patent application Ser. No. 16/001,260, titled "Light Emitting Diode (LED) Lighting Device Or Lamp With Configurable Light Qualities," filed Jun. 6, 2018, as well as U.S. patent application Ser. No. 15/274,575, titled "Light Emitting Diode (LED) Lighting Device Or Lamp With Configurable Light Qualities," filed Sep. 23, 2016, now U.S. Pat. No. 9,801,250, the entire contents of both of which are incorporated herein by reference. It will be appreciated that the multiple lighting elements of the controllable multiple lighting element fixture described herein may be controlled or operated by way of a physical switch attached to or situated on the controllable multiple lighting element fixture. It will be further appreciated that the multiple lighting elements of the controllable multiple lighting element fixture described herein may be controlled or operated by way of a wall switch communicably and/or electrically coupled with the controllable multiple lighting element fixture as described below with respect to the example embodiments of control circuitry.

In certain embodiments, the multiple lighting elements of the controllable lighting element fixture are associated with various lighting zones of a plurality of lighting zones associated with the controllable lighting element fixture. That is, a given lighting element may provide light for a first lighting zone, while a different lighting element may provide light for a second lighting zone. In embodiments, there may be overlap of lighting provided for some or all of the lighting zones.

In certain embodiments, a set of lighting elements of the controllable lighting element fixture may be situated or positioned along or within a circumference or perimeter (e.g., outer perimeter or circumference) of the controllable lighting element fixture. The set of lighting elements may be associated with a downward or outward lighting zone providing lighting in a downward direction from the controllable lighting elements fixture or in an outward direction from the controllable lighting elements fixture.

In certain embodiments, any combination of types of lighting elements may be employed in a controllable lighting element fixture. That is, lighting elements comprising light emitting diode (LED) devices, fluorescent devices, incandescent devices, or halogen devices, may be used in the controllable lighting element fixture without limitation.

In certain embodiments, lighting elements of the present disclosure may include dual CCT lighting elements (e.g., dual CCT lamps) that enable adjusting of CCT with the sockets in which the lighting elements are plugged or with which the lighting elements are electrically coupled (e.g., through cycling). In certain embodiments, lighting elements of the present disclosure may enable adjustments to lumens (e.g., 50% lumen change) of an incandescent or LED lighting element when an actuatable switch is toggled.

FIG. 1 illustrates an example controllable multiple lighting element fixture 100 according to various embodiments of the present disclosure. In FIG. 1, a controllable multiple lighting element fixture 100 includes a lighting housing 101 and control circuitry (not shown). Multiple first lighting elements 105A and 105B are positioned within or along the lighting housing 101. A second lighting element 106, such as a set of second lighting elements 106, may be is positioned within or along a circumference or perimeter of the lighting housing 101. The set of second lighting elements 106 may share a light-emitting surface 107 that is positioned to receive light from and downward from the set of lighting elements 106. The control circuitry (not shown) is configured to control one or more parameters associated with the first lighting elements 105A and 105B and the second lighting element 106. For example, the one or more parameters (e.g., in addition to on or off) may include direction, color, temperature, dim level, or voltage.

In FIG. 1, each first lighting element 105A and 105B is associated with a unique lighting zone of multiple lighting zones provided by the controllable multiple lighting element fixture 100 (e.g., lighting zones may overlap). Shown in FIG. 1, the second lighting element 106 is associated with a downward lighting zone 110 extending downward from the lighting housing 101.

In FIG. 1, each of the first lighting elements 105A, 105B is operable and customizable independently from one another and from the second lighting element 106. It will be appreciated that, while the example first lighting elements 105A, 105B are depicted as conventional/incandescent type lighting devices, the first lighting elements 105A, 105B (as well as the second lighting elements herein) may be of any type of suitable lighting device for the purposes described herein.

Figure 2:
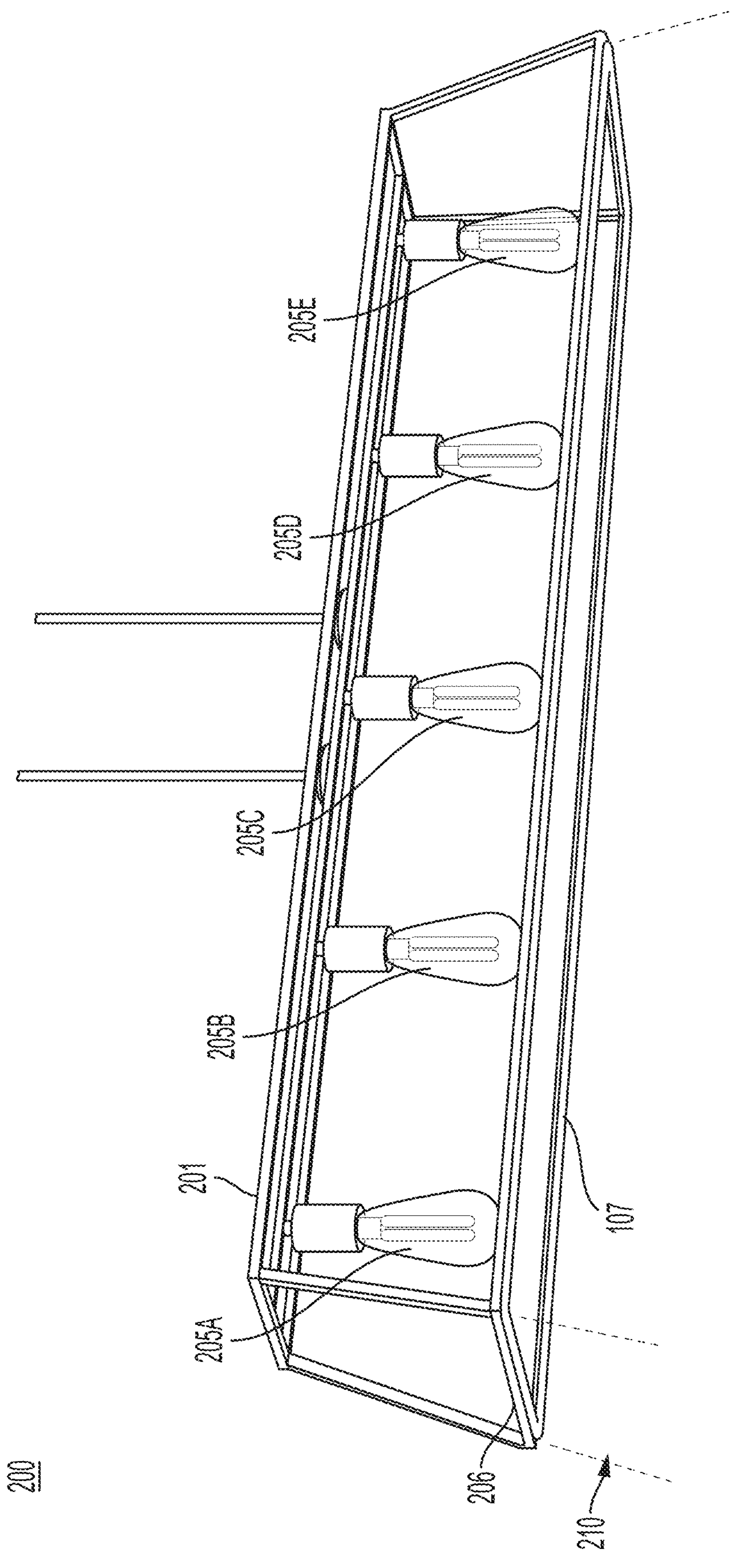
FIG. 2 illustrates an example controllable multiple lighting element fixture according to various embodiments of the present disclosure.

FIG. 2 illustrates an example controllable multiple lighting element fixture 200 according to various embodiments of the present disclosure. In FIG. 2, a controllable multiple lighting element fixture 100 includes a lighting housing 201 and control circuitry (not shown). Multiple first lighting elements 205A, 205B, 205C, 205D, and 205E are positioned within or along the lighting housing 201. A second lighting element 206 is positioned within or along a circumference or perimeter of the lighting housing 201. The control circuitry (not shown) is configured to control one or more parameters associated with the first lighting elements 205A, 205B, 205C, 205D, and 205E and the second lighting element 206. For example, the one or more parameters (e.g., in addition to on or off) may include direction, color, temperature, dim level, or voltage.

In FIG. 2, each first lighting element 205A, 205B, 205C, 205D, and 205E is associated with a unique lighting zone of multiple lighting zones provided by the controllable multiple lighting element fixture 200 (e.g., lighting zones may overlap). Shown in FIG. 2, the second lighting element 206 is associated with a downward lighting zone 210 extending downward from the lighting housing 201.

In FIG. 2, each of the first lighting elements 205A, 205B, 205C, 205D, and 205E is operable and customizable independently from one another and from the second lighting element 206.

Figure 3:
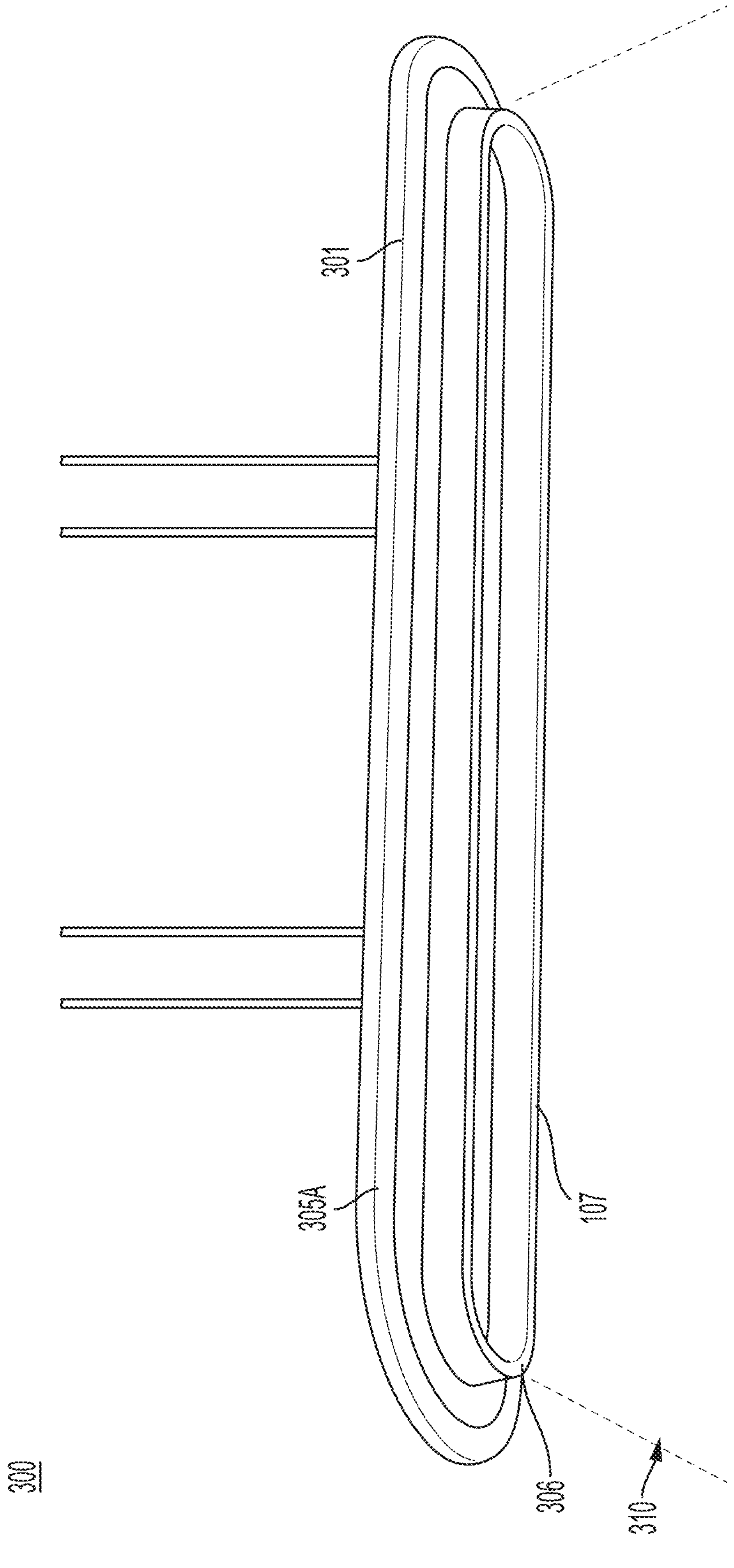
FIG. 3 illustrates an example controllable multiple lighting element fixture according to various embodiments of the present disclosure.

FIG. 3 illustrates an example controllable multiple lighting element fixture 300 according to various embodiments of the present disclosure. In FIG. 3, a controllable multiple lighting element fixture 300 includes a lighting housing 301 and control circuitry (not shown). A first lighting element 305A is positioned within or along the lighting housing 301. A second lighting element 306 is positioned within or along a circumference or perimeter of the lighting housing 301. The control circuitry (not shown) is configured to control one or more parameters associated with the first lighting element 305A and the second lighting element 206. For example, the one or more parameters (e.g., in addition to on or off) may include direction, color, temperature, dim level, or voltage.

In FIG. 3, the first lighting element 305A is associated with a unique lighting zone of multiple lighting zones provided by the controllable multiple lighting element fixture 300 (e.g., lighting zones may overlap). Shown in FIG. 3, the second lighting element 306 is associated with a downward lighting zone 310 extending downward from the lighting housing 301.

In FIG. 3, the first lighting element 305A is operable and customizable independently from the second lighting element 306.

Figure 4:
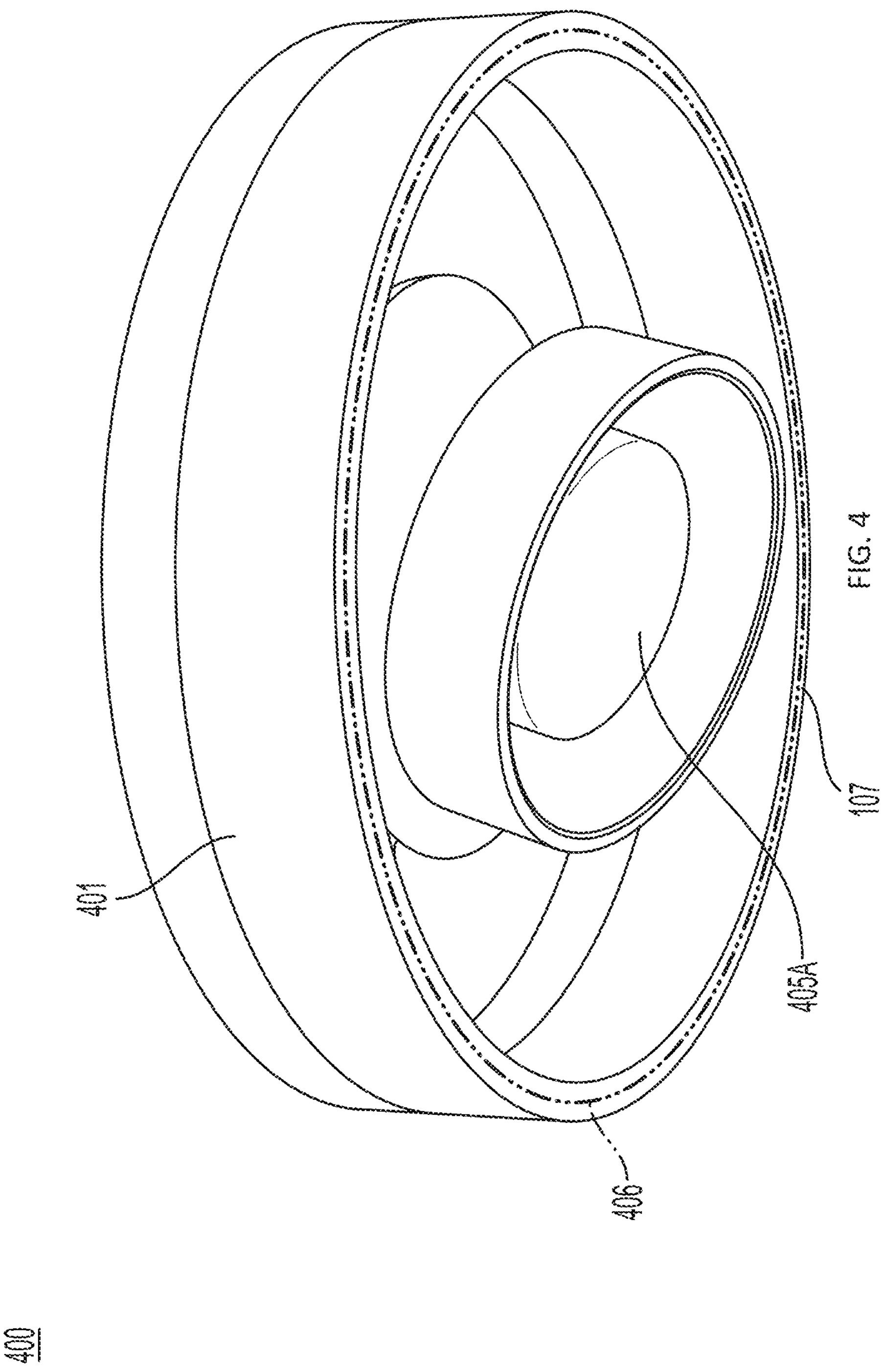
FIG. 4 illustrates an example controllable multiple lighting element fixture according to various embodiments of the present disclosure.

FIG. 4 illustrates an example controllable multiple lighting element fixture 400 according to various embodiments of the present disclosure. In FIG. 4, a controllable multiple lighting element fixture 400 includes a lighting housing 401 and control circuitry (not shown). A first lighting element 405A is positioned within or along the lighting housing 301. A second lighting element (e.g., shown as dashed line 406 in FIG. 4) may be positioned within or along a circumference or perimeter of the lighting housing 401. The control circuitry (not shown) is configured to control one or more parameters associated with the first lighting element 405A and the second lighting element (when present). For example, the one or more parameters (e.g., in addition to on or off) may include direction, color, temperature, dim level, or voltage.

FIG. 5 illustrates an example system architecture 500 within which embodiments of the present disclosure may operate. In FIG. 5, an example controllable multiple lighting element fixture (e.g., 100, 200, 300, 400) may include one or more first lighting elements (e.g., 505A, 505B, . . . , 505N) and one or more second lighting elements (e.g., 506A, 506B, . . . , 506N). The example controllable multiple lighting element fixture (e.g., 100, 200, 300, 400) may further include control circuitry 502 configured to operate and/or customize operation of each of the one or more first lighting elements (e.g., 505A, 505B, . . . , 505N) and each of the one or more second lighting elements (e.g., 506A, 506B, . . . , 506N). The control circuitry 502 may be configured to communicate, by way of a communications network 504, with one or more computing devices 501A, 501B, . . . 501N. The control circuitry 502 may be further configured to receive signals from wall mounted switch circuitry 503. Computing devices 501A, 501B, . . . , 501N may be any mobile or other computing devices or may be implemented by way of a remote control device.

In certain embodiments, the wall mounted switch circuitry 503 may comprise one or more TRIAC dimmers for use in conjunction with control circuitry 502. Embodiments of the present disclosure enable control of controllable multiple lighting element fixtures comprising any type of lighting element (e.g., LED, incandescent, halogen) using TRIAC dimmers, physical switches, wall mounted switch circuitry, remote mobile computing devices, and/or any combination thereof. One or more physical switches of an example controllable multiple lighting element fixture described herein may be physically actuatable by a user to enable various parameter changes and/or mode changes (e.g., from a manual control mode to a remote control mode involving a remote computing or other device). In certain embodiments, the one or more physical switches that are physically actuatable may be configured to enable placing the example controllable multiple lighting element fixture in a first operating mode (e.g., a "smart" operating mode whereby the fixture is controllable by way of remote computing device, over WiFi, etc.) or a second operating mode (e.g., an "automatic" operative mode whereby other actuatable switches associated with the fixture may be employed to control CCT and dimming functions of the fixture).

Communications network 504 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 504 may include a cellular telephone, an 802.11, 802.16, 802.20, and/or WiMax network. Further, the communications network 504 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the controllable multiple lighting element fixture system. In some embodiments, the protocol is a custom protocol of JSON objects sent via a Websocket channel. In some embodiments, the protocol is JSON over RPC, JSON over REST/HTTP, and the like.

In embodiments where a computing device 501A-501N is a mobile device, such as a smart phone or tablet, the computing device 501A-501N may execute an "app" to interact with the control circuitry 502. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

FIG. 6 illustrates example control circuitry for use with various embodiments of the present disclosure. In FIG. 6, example control circuitry 502 may include a communication module 620 for receiving input signals from a remote computing device and/or switch circuitry. A microcontroller 621 of the control circuitry 502 may control operation of the control circuitry 502 according to received signals. The control circuitry 502 may further include driver circuitry for adjusting parameters for one or more lighting elements controlled by the control circuitry 502. The driver circuitry 624 may be situated such that it controls the supply of a power source 623 to the one or more lighting elements 625 (e.g., adjusts a supply voltage).

The control circuitry 502 may include a memory 622 for storing programmed designated themes. A theme may include one or more of office lighting, desk lighting, kitchen lighting, evening lighting, night light lighting, dining lighting, or other programmable scene.

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. A lighting fixture, comprising:
- a lighting housing;
- one or more first lighting elements associated with the lighting housing;
- a plurality of second lighting elements associated with the lighting housing and positioned at different location than the one or more first lighting elements; and
- a light emitting surface associated with the lighting housing and positioned to receive light from and downward from the plurality of second lighting elements relative to a perimeter of the lighting housing,
- wherein the light emitting surface is not positioned to receive light from and downward from the one or more first lighting elements relative to the perimeter of the lighting housing.

2. The lighting fixture of claim 1, wherein each first lighting element of the one or more first lighting elements is associated with a unique lighting zone of a plurality of lighting zones.

3. The lighting fixture of claim 2, wherein the plurality of lighting zones may overlap.

4. The lighting fixture of claim 1, wherein the plurality of second lighting elements define a downward lighting zone extending downward relative to the lighting housing.

5. The lighting fixture of claim 1, wherein the lighting fixture comprises control circuitry configured to control one or more parameters associated with the one or more first lighting elements and the plurality of second lighting elements, and wherein the control circuitry is responsive to signals received from a remote computing device.

6. The lighting fixture of claim 1, wherein the lighting fixture comprises control circuitry configured to control one or more parameters associated with the one or more first lighting elements and the plurality of second lighting elements, and wherein the control circuitry is responsive to signals received from wall mounted switch circuitry.

7. The lighting fixture of claim 1, wherein the lighting fixture comprises control circuitry configured to control one or more parameters associated with the one or more first lighting elements and the plurality of second lighting elements, and wherein the one or more parameters further include one or more of color, temperature, dim level, or voltage.

8. The lighting fixture of claim 7, wherein the control circuitry comprises driver circuitry for controlling the one or more parameters.

9. The lighting fixture of claim 8, wherein the control circuitry is configured to adjust one or more parameters for any of the one or more first lighting elements and the plurality of second lighting elements in accordance with a designated theme of a plurality of programmable themes.

10. The lighting fixture of claim 9, wherein a theme of the plurality of programmable themes includes one or more of office lighting, desk lighting, kitchen lighting, evening lighting, night light lighting, or dining lighting.

11. The lighting fixture of claim 1, wherein one or more of the one or more first lighting elements are operable independently from one or more of the plurality of second lighting elements.

12. A method of controlling a lighting fixture, the method comprising:
- controlling a plurality of second lighting elements that are associated with a lighting housing, wherein light emitted from the plurality of second lighting elements travels through a light emitting surface that is associated with the lighting housing and positioned to receive light from and downward from the plurality of second lighting elements relative to a perimeter of the lighting housing; and
- controlling one or more first lighting elements that are associated with the lighting housing and positioned at a different location than the plurality of second lighting elements, wherein the light emitted from the one or more first lighting elements does not travel through the light emitting surface.

13. The method of claim 12, wherein each first lighting element of the one or more first lighting elements is associated with a unique lighting zone of a plurality of lighting zones.

14. The method of claim 12, wherein the plurality of second lighting elements are associated with a downward lighting zone extending downward from the lighting housing.

15. The method of claim 12, further comprising:
- receiving, by control circuitry, signals received from a remote computing device; and
- adjusting one or more parameters associated with one or more first lighting elements of the one or more first lighting elements or one or more second lighting elements of the plurality of second lighting elements based on the signals.

16. The method of claim 12, further comprising:
- receiving, by control circuitry, signals received from wall mounted switch circuitry; and
- adjusting one or more parameters associated with one or more first lighting elements of the one or more first lighting elements or one or more second lighting elements of the plurality of second lighting elements based on the signals.

17. The method of claim 16, wherein the one or more parameters further include one or more of color, temperature, dim level, or voltage.

18. The method of claim 16, wherein the control circuitry comprises driver circuitry for controlling the one or more parameters.

19. The method of claim 18, further comprising:
- adjusting, using the control circuitry, one or more parameters for any of the one or more first lighting elements and the plurality of second lighting elements in accordance with a designated theme of a plurality of programmable themes.

20. The method of claim 12, wherein one or more of the one or more first lighting elements are operable independently from one or more of the plurality of second lighting elements.

21. A lighting fixture comprising:
- a lighting housing;
- one or more first lighting elements positioned within the lighting housing; and
- a plurality of second lighting elements positioned within or along a lower perimeter of the lighting housing, wherein:
  - the lower perimeter of the lighting housing is positioned downward from and outward from the one or more first lighting elements, and
- wherein the plurality of second lighting elements and the lighting housing are configured to allow the plurality of second lighting elements to directly illuminate a target area below the lighting housing.

* * * * *